(12) United States Patent
Trelohan et al.

(10) Patent No.: US 8,120,846 B2
(45) Date of Patent: Feb. 21, 2012

(54) PROJECTOR SCREEN EQUIPPED WITH MEANS FOR APPLYING VERTICAL AND HORIZONTAL TENSILE FORCES

(76) Inventors: Yves Trelohan, Orvault (FR); Yann Charlot, Le Rheu (FR)

( * ) Notice: Subject to any disclaimer, the term of this patent is extended or adjusted under 35 U.S.C. 154(b) by 0 days.

(21) Appl. No.: 12/989,842

(22) PCT Filed: Apr. 10, 2009

(86) PCT No.: PCT/FR2009/050662
§ 371 (c)(1),
(2), (4) Date: Oct. 27, 2010

(87) PCT Pub. No.: WO2009/136113
PCT Pub. Date: Nov. 12, 2009

(65) Prior Publication Data
US 2011/0043908 A1    Feb. 24, 2011

(30) Foreign Application Priority Data

Apr. 28, 2008 (FR) .................................. 08 02361

(51) Int. Cl.
*G03B 21/56* (2006.01)
(52) U.S. Cl. ......................................................... 359/461
(58) Field of Classification Search .................. 359/443, 359/461; 160/120, 121.1
See application file for complete search history.

(56) References Cited

U.S. PATENT DOCUMENTS

| | | | |
|---|---|---|---|
| 4,406,519 A * | 9/1983 | Shaw | 359/443 |
| 7,510,111 B2 * | 3/2009 | Mikkelsen et al. | 235/375 |
| 7,872,802 B2 * | 1/2011 | Seymour | 359/461 |
| 2005/0237610 A1 | 10/2005 | Sekiguchi et al. | |
| 2006/0077356 A1 | 4/2006 | Merczak | |
| 2008/0030853 A1 * | 2/2008 | Creel | 359/461 |
| 2008/0174865 A1 * | 7/2008 | Stewart | 359/450 |

FOREIGN PATENT DOCUMENTS

| | | |
|---|---|---|
| DE | 4400278 A1 | 7/1995 |
| GB | 691230 A | 5/1953 |
| GB | 941198 A | 11/1963 |
| WO | 2006077083 A1 | 7/2006 |

OTHER PUBLICATIONS

International Search Report, dated Oct. 7, 2009, from corresponding PCT application.

* cited by examiner

*Primary Examiner* — Christopher Mahoney (57) ABSTRACT

A projection screen (1) has a projection surface (2), support elements (4) for supporting the projection surface in the suspended state, elements for exerting vertical traction forces (FV) including elements (5) for weighting the bottom longitudinal edge of the projection surface, and elements for exerting horizontal traction forces (FH) including firstly two deformable elongate elements (9, 10) each connected to one of the lateral edges of the projection surface and secondly elements (11) for weighting each deformable elongate element. According to the invention, the weighting elements for exerting horizontal traction forces and the weighting elements for exerting vertical traction forces are distinct and are mounted to perform independent weighting action in at least one position corresponding to the or one of the utilization positions.

11 Claims, 4 Drawing Sheets

PROJECTOR SCREEN EQUIPPED WITH MEANS FOR APPLYING VERTICAL AND HORIZONTAL TENSILE FORCES

The present invention relates in general manner to projection screens for viewing videos, still images, or indeed computer presentations. The term "projection screen" is used to mean a screen that is suitable for being used with a protector device of traditional type or of back-projector type, it being possible for said screen to be plane or curved.

More particularly, the invention relates to a projection screen comprising:

a projection surface of generally rectangular shape, presenting two longitudinal edges at the top and the bottom that are substantially horizontal and two lateral edges, said surface being suitable for being tensioned and extending at least in part in a plane that is substantially vertical, at least in a utilization position;

support means for supporting the projection surface in the suspended state in said at least one utilization position, said support means being connected to the top longitudinal edge of the projection surface;

means for exerting vertical traction forces on the projection surface, said means comprising at least weighting means fastened to or in the vicinity of the bottom longitudinal edge of the projection surface; and means for exerting horizontal traction forces on the projection surface, said means comprising at least firstly weighting means, and secondly two deformable elongate elements such as cables or cords, each element being connected at, or in the vicinity of, its top end to said support means and at, or in the vicinity of, its bottom end to said weighting means, and also being connected to a corresponding one of the lateral edges of the projection surface, each elongate element being arranged to apply the load of said associated weighting means in the form of horizontal traction forces to the corresponding lateral edge.

In the utilization position, the projection surface needs to be as close as possible to the shape desired for said surface in order to avoid deformation appearing on the projection surface. For a "flat" screen, the projection surface should be as plane as possible, and for a "curved" screen, the projection surface should present a certain amount of curvature in the utilization position. Any deformation of the projection surface is usually referred to as waves or folds and gives rise to distortions in the projected image.

An important characteristic of the projection surface is its coefficient of elasticity. In particular, with a roll-up screen, the projection surface needs to be sufficiently flexible to be capable of being rolled up, while also being sufficiently rigid to be capable of being tensioned correctly so as to obtain good planeness or the desired curvature.

In the state of the art, the simplest solution known for tensioning a rectangular projection surface having its top longitudinal edge fastened to support means, such as a roller or a support bar, consists in fastening a metal bar, also referred to as a weighting bar, to the bottom longitudinal edge of said projection surface. The rigidity and the weight of the weighting bar serves to apply vertical traction all along the top and bottom longitudinal edges of the projection surface.

Nevertheless, that solution does not enable a regular plane or curved shape to be obtained for the projection surface that is adequate and reliable over time. Undulations and warping of the lateral edges of the projection surface may appear, as may waves or folds in the central portion of the projection surface.

Figure 1:
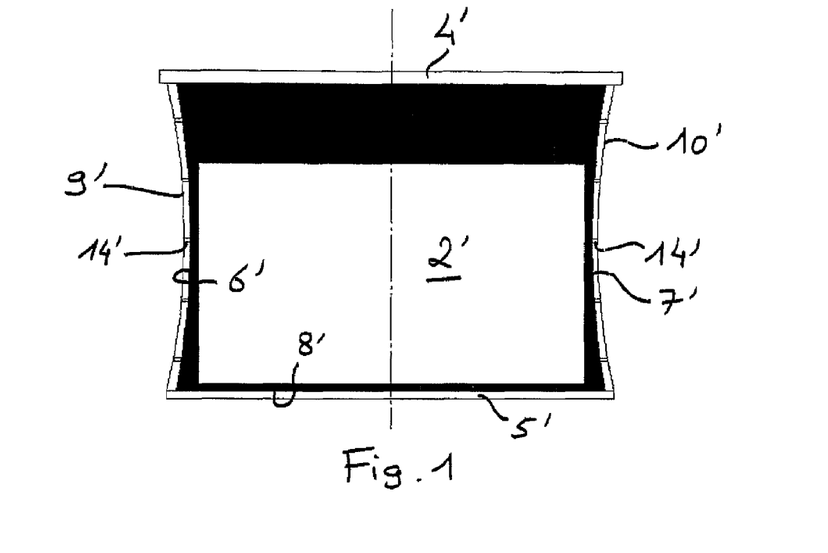
FIG. 1 is a face view of a roll-up projection screen of the "tab tensioning" type, as exists in the state of the art.
Figure 2:
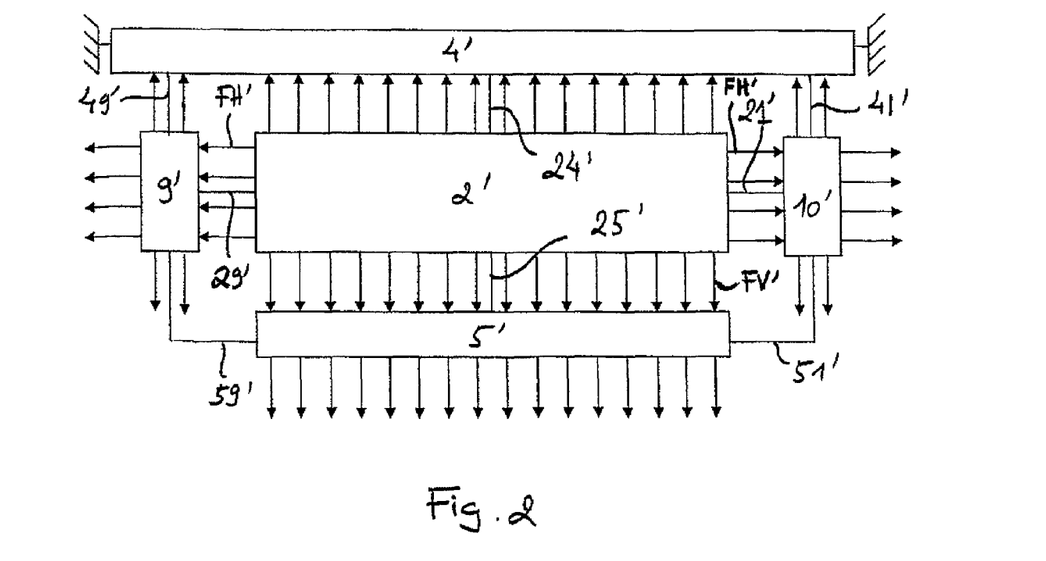
FIG. 2 is a diagrammatic view of the mechanical connections and the distributions of forces between the various members of the FIG. 1 projection screen.

A solution that has been adopted by numerous manufacturers for obtaining better planeness of the projection surface, in particular by limiting the risk of undulations in the lateral edges of the projection surface is known as "tab tensioning" and consists in subjecting the projection surface to horizontal traction forces as well as to vertical traction forces exerted by means of the weighting bar. FIG. 1 is a face view of a roll-up projection screen of the tab tensioning type of the kind that exists in the state of the art. FIG. 2 is a diagrammatic view of the mechanical connections 49', 29', 59', 24', 25', 51', 21', and 41' and of the distributions of forces (represented by arrows) between the various members of the FIG. 1 projection screen. As shown in FIG. 1, two cables (or cords) 9', 10' are connected to the lateral edges 6', 7' of the projection surface 2' by attachment elements 14' or by guide elements (e.g. eyelets), such that each cable 9', 10' extends along a circularly arcuate line when the projection surface 2' is in the rolled-out state. The top end of each cable 9', 10' is directly connected to a corresponding end of the roller 4' supporting the projection surface, and the bottom end of each cable 9', 10' is connected to the bar 5' for weighting the bottom longitudinal edge 8' of the projection surface. Under the effect of the weight of the weighting bar 5', each cable 9', 10' is tensioned, thereby increasing the radius of the circular arc formed by each cable 9', 10' and thus exerting horizontal traction forces FH' along the lateral edges 6', 7' of the projection surface. Arranging each cable 9', 10' as a circular arc thus makes it possible to obtain a uniform distribution of horizontal traction forces along the corresponding lateral edge 6', 7'.

Nevertheless, with such a solution, some fraction of the weight of the weighting bar 5' is taken up by the bottom longitudinal edge 8' of the projection surface, and the remaining fraction of its weight is taken up by the cables 9' and 10'. As shown diagrammatically by the mechanical connections 25', 59', and 51' in FIG. 2, the weighting bar 5' is mechanically connected firstly to the cables 9' and 10' and secondly to the bottom longitudinal edge 8' of the projection surface. As a result, the horizontal traction forces FH' exerted on the lateral edges 6', 7' of the projection surface as a result of the cables being tensioned, are coupled to the vertical traction forces FV' exerted by the weighting bar on the bottom longitudinal edge 8' of the projection surface. In other words, such a solution does not enable said horizontal traction forces to be adjusted independently of the vertical traction forces exerted on the projection surface.

Although such a solution can suffice for tensioning projection surfaces having a high coefficient of elasticity, that solution is not appropriate for correctly tensioning a projection surface of lower elasticity. In order to tension a so-called "low elasticity" projection surface, it is necessary to increase the horizontal traction forces on the lateral edges of the projection surface and thus to increase the vertical traction forces exerted on the ends of the cables. Provision can then be made to increase the weight of the weighting bar. Nevertheless, with a roll-up screen, since the weighting bar is connected to the bottom longitudinal edge of the projection surface that is itself connected to the roller, the weight of the weighting bar is taken up in part by said roller, which then sags in its center as a result of the increase in the weight of the weighting bar. The problem of roller sagging can be limited by increasing the diameter and/or the thickness of the roller, however that solution gives rise to problems of accommodating the roller inside the protection casing that houses said roller. In addition, a weighting bar with excessive weight runs the risk of damaging the projection surface, or even tearing it.

Another solution of the "tab tensioning" type is also known from document WO 2006/077083 whereby each cable bottom end is connected to a short heavy element that is itself pivotally connected to an end of the weighting bar via a hinge type connection. Such a system enables the tension in the cables to be adjusted by applying a load to the bottom end of each cable that is different from the load applied to the bottom longitudinal edge of the projection surface. Nevertheless, because of the pivot connection between each heavy element and the weighting bar, a fraction of the weight of each heavy element is taken up by said weighting bar. The weight of the heavy element connected to each cable thus influences the vertical traction forces exerted by the weighting bar on the projection surface. The vertical traction forces exerted on the projection surface are therefore not independent of the horizontal traction forces exerted on said projection surface, thereby complicating adjustment of the tension in the fabric. As a result it is still difficult to obtain good planeness for the projection surface using such a solution.

Furthermore, since the two heavy elements are connected to the ends of the weighting bar, the length of said elements needs to be limited so as to avoid increasing the total width occupied by the screen and so as to avoid interfering with rolling up the projection surface. As a result the weight of those heavy elements is limited and does not always enable sufficient horizontal traction forces to be applied to the lateral edges of the projection surface. Even if the weight of said heavy elements is sufficient to tension the cables correctly, the projection surface still runs the risk of being subjected to an increase in vertical traction forces as a result of a fraction of the weight of said two heavy elements being taken up by the weighting bar via the pivot connection.

In its embodiment shown in FIG. 4, document DE 44 00 278 describes a projection screen presenting a fabric having its bottom edge tensioned by means of a weighting bar, and having its lateral edges connected to each other by a cord fitted with a tensioning system made up of springs and deflector pulleys housed in the ground. It is the springs that serve to exert a traction force on the cord. Thus, it is the stretching of the springs, given their stiffness, that enables a traction force to be applied to the cord connected to the lateral edges of the fabric. Such a system requires anchor or retaining points to be provided for the springs outside the screen. Thus, in document DE 44 00 278, these spring retaining or anchor points are formed by pulleys fastened in a housing formed in the ground, beneath the fabric of the screen, in order to mask the pulleys and the springs of the system for tensioning the cords. The use of springs in the design of the cord tensioning system is not reliable because the stiffness of the springs is likely to vary over time. Thus, after operating for a certain length of time the system needs to be readjusted so as to apply the desired return force on the cord, and in the end the springs need to be changed. In addition, such a spring system is unattractive in appearance since the springs extend beneath the screen down to their retaining or anchor zone.

An object of the present invention is to provide a projection screen, preferably a roll-up screen, comprising a projection surface that presents improved compliance with the shape desired for the projection surface when in the utilization position. In other words, the object of the invention is to enable the projection surface in the utilization position to present a regular shape that corresponds to the desired plane or curved shape.

Another object of the invention is to limit any risk of the lateral edges of the projection surface warping, without it being necessary to increase the vertical traction forces exerted on said projection surface.

Another object of the invention is to propose a projection screen for which the means used to tension the lateral edges of the projection surface are reliable in operation and simple to implement.

To this end, the invention provides a projection screen comprising:

a projection surface of generally rectangular shape, presenting two longitudinal edges at the top and the bottom that are substantially horizontal and two lateral edges, said surface being suitable for being tensioned and extending at least in part in a plane that is substantially vertical, at least in a utilization position;

support means for supporting the projection surface in the suspended state in said at least one utilization position, said support means being connected to the top longitudinal edge of the projection surface;

means for exerting vertical traction forces on the projection surface, said means comprising at least weighting means fastened to or in the vicinity of the bottom longitudinal edge of the projection surface; and means for exerting horizontal traction forces on the projection surface, said means comprising at least firstly weighting means, and secondly two deformable elongate elements such as cables or cords, each element being connected at, or in the vicinity of, its top end to said support means and at, or in the vicinity of, its bottom end to said weighting means, and also being connected to a corresponding one of the lateral edges of the projection surface, each elongate element being arranged to apply the load of said associated weighting means in the form of horizontal traction forces to the corresponding lateral edge;

the screen being characterized in that said weighting means for exerting horizontal traction forces and said weighting means for exerting vertical traction forces are distinct and are mounted to exert independent weighting actions in at least one position corresponding to said or one of said utilization positions.

The projection screen of the invention may be fixed, or it may be of the roll-up type. The screen may also be of the "plane" type or of the "curved" type.

Compared with screens in the state of the art, when the screen of the invention is in the utilization position, the weighting means for exerting vertical traction forces are no longer in bearing contact with the weighting means for exerting horizontal traction forces, thus ensuring that in the weighting position said means for weighting the bottom longitudinal edge of the projection surface are not subjected to the weight of the means for weighting the bottom ends of the deformable elongate element. This design of screen thus enables the horizontal traction forces to be increased by increasing the weight of the means for weighting said elongate element without it being necessary to increase the weight of the means for weighting the bottom longitudinal edge of the projection surface.

Since the weighting actions of said weighting means respectively on the deformable elongate elements and on the bottom longitudinal edge of the projection surface are independent, the horizontal and vertical traction forces acting on the projection surface are decoupled, thereby making it possible to vary said horizontal traction forces independently of said vertical traction forces.

In other words, such a design of screen makes it possible to set or adjust the horizontal traction forces exerted on the lateral edges of the projection surface independently of the vertical traction forces exerted on the longitudinal edges of said projection surface.

Thus, by being able to exert horizontal traction forces on the projection surface independently of the vertical traction forces, it is possible to obtain a tensioned projection surface that presents a regular shape corresponding to the desired plane or curved shape.

In addition, by means of such a design for the screen and the weighting means, the overall length of the screen is not increased.

When the means for supporting the projection surface in the suspended state are formed by a long element such as a roller (or a bar) this is supported by its ends, and when the deformable elongate elements are connected to portions of the roller close to said supported ends, the risk of the roller bending in its center is reduced. The weight of the means for weighting the deformable elongate elements is taken up mainly by said portions of the roller situated close to its supported ends. The weighting means connected to the bottom longitudinal edge of the projection surface, and thus indirectly connected to the roller, no longer take up the weight of the means for weighting the deformable elongate elements when the screen is in its utilization position. The risk of tearing or damaging the projection surface is thus also reduced.

The term "weighting means" is used to mean heavy means that, merely by their weight, exert a traction force on the element(s) to which they are fastened. In other words, the traction force applied to said element(s) by the weighting means results solely from the force of gravity applied to the mass of said weighting means suspended from said element(s).

Thus, the mere weight of the weighting means applied to or in the vicinity of the bottom ends of the elongate elements, such as cables or cords, suffices to tension said elongate elements and to exert a horizontal traction force on the lateral edges of the projection surface to which said elongate elements are connected. There is therefore no need to use a spring tensioning system of the kind that exists in the state of the art, where such systems are complex to implement and relatively unreliable in operation as a result of their springs wearing. Under gravity, the screen weighting means of the invention exert a force that is constant over time on the elongate elements connected to the lateral edges of the projection surface, and such weighting means are not the subject of wear. Furthermore, the weighting means do not require an anchor zone external to the screen, since it suffices to suspend them from said element(s) to which it is desired to apply a traction force, thereby simplifying mounting and not harming the appearance of the screen.

According to an advantageous characteristic of the invention, the weighting means fastened to, or in the vicinity of, the bottom end of one of the deformable elongate elements are coupled to weighting means that are fastened to, or in the vicinity of, the bottom end of another one of said elongate elements to form an assembly that moves as a unit in said vertical direction.

According to an advantageous characteristic of the invention, the weighting means fastened to, or in the vicinity of, the bottom longitudinal edge of the projection surface are formed by a weighting bar extending substantially parallel to said bottom longitudinal edge, and the weighting means fastened to, or in the vicinity of, the bottom ends of the deformable elongate elements are formed by another weighting bar interconnecting the bottom ends of said elements and extending substantially parallel to the bar weighting the bottom longitudinal edge of the projection surface.

The use of a weighting bar connecting together the bottom ends of the elongate elements makes it possible to exert large traction forces on said elongate elements while limiting the size of the screen in width. In addition, since the means for weighting the elongate elements are formed by a single bar, the weight of said bar is taken up uniformly for each of said elongate elements, thereby simplifying adjustment of the horizontal tensioning of the projection surface. Similarly, the use of another weighting bar that is connected to the longitudinal edge of the projection surface enables vertical traction forces to be exerted thereon that are distributed in uniform manner.

According to an advantageous characteristic of the invention, the weighting means fastened to, or in the vicinity of, the ends of the deformable elongate elements are formed by a hollow bar having said means for weighting the bottom longitudinal edge of the projection surface housed therein with vertical clearance in the utilization position of the screen, said means for weighting the bottom longitudinal edge of the projection surface preferably being formed by a weighting bar.

According to an advantageous characteristic of the invention, there are provided means for adjusting the level of the weighting means for exerting horizontal traction forces relative to the weighting means for exerting vertical traction forces, such that in the desired utilization position for the projection surface, said weighting means for exerting horizontal traction forces and said weighting means for exerting vertical traction forces are free from mutual vertical retaining or bearing contact.

In a preferred embodiment of the invention, the screen is of the roll-up type. Said means for supporting the projection surface in the suspended state are formed by a roller around which the projection surface can be rolled up or rolled out. Said weighting means for exerting horizontal traction forces and said weighting means for exerting vertical traction forces are distinct and are mounted to perform their weighting actions independently in at least one at least partially rolled-out position of the projection surface corresponding to the or one of said utilization positions.

A roll-up screen enables the user to vary the length of projection surface that is rolled out as a function of the format desired for the projection surface. The length of projection surface that the user selects to roll out in order to obtain a given format corresponds to a utilization position of the screen.

According to an advantageous characteristic of the invention, said weighting means for exerting horizontal traction forces and said weighting means for exerting vertical traction forces move relative to each other axially along the roll-up and roll-out directions in order to occupy at least two positions, one position in which the weighting means for exerting horizontal traction forces and the weighting means for exerting vertical traction forces are free from mutual vertical retaining or bearing contact, and another position in which the weighting means for exerting horizontal traction forces and the weighting means for exerting vertical traction forces come into vertical retaining or bearing contact, the portions of said weighting means that come into contact forming entrainment means for entraining vertical movement of the means for weighting the deformable elongate elements, said entrainment means being active during rolling up over a fraction of the rolling-up stroke of the projection surface.

In a particular embodiment of the invention, of the type in which the means for weighting the deformable elongate elements and the means for weighting the bottom longitudinal edge of the projection surface are formed respectively by a hollow weighting bar referred to as a horizontal traction bar, and by another weighting bar referred to as a vertical traction bar, said vertical traction bar being received inside the horizontal traction bar with vertical clearance in the utilization position, said entrainment means are formed by an inside bearing surface of said horizontal traction bar suitable for co-operating with an outside bearing surface of the vertical traction bar.

Thus, the bearing surfaces on the bars that are designed to come into contact form plane bearing surfaces that serve to limit the vertical clearance between the two bars while rolling up the projection surface around the roller. By means of these plane bearing surfaces, while the vertical traction bar is being raised the horizontal traction bar is entrained by the vertical traction bar which takes up a fraction of its weight. The deformable elongate elements or cables are thus relieved in tension, thereby eliminating the horizontal traction forces on the lateral edges of the projection surface in such a manner as to enable it to be rolled up properly.

In another particular embodiment of the invention, of the type in which the means for weighting the deformable elongate elements and the means for weighting the bottom longitudinal edge of the projection surface are formed respectively by a hollow weighting bar referred to as a horizontal traction bar, and by another weighting bar referred to as a vertical traction bar, said vertical traction bar being received inside the horizontal traction bar with vertical clearance in the utilization position, said entrainment means are formed by sets of male and female type members, one of said sets of male and female type members being carried by the end portions of the horizontal traction bar and the other set by the end portions of the vertical traction bar, said male and female members being moved relative to one another axially in the roll-up and roll-out directions so as to occupy at least two positions, one in which said male and female type members are free of mutual vertical or retaining contact and the other in which the male and female type members come into mutual vertical retaining or bearing contact.

The invention can be well understood on reading the following description of embodiments given with reference to the accompanying drawings, in which.

In the description below, the terms "horizontal" and "vertical" are used relative to the rolled-out configuration of the screen. In the examples shown, the projection screen is of the roll-up type. Naturally the invention also applies to a fixed screen. In the example shown in the figures, the screen is said to be "flat", i.e. in its utilization position the rolled-out projection surface must be plane. In a variant, the screen of the invention may be a so-called "curved" screen, with its projection surface then presenting a certain amount of curvature in the utilization position.

Figure 3:
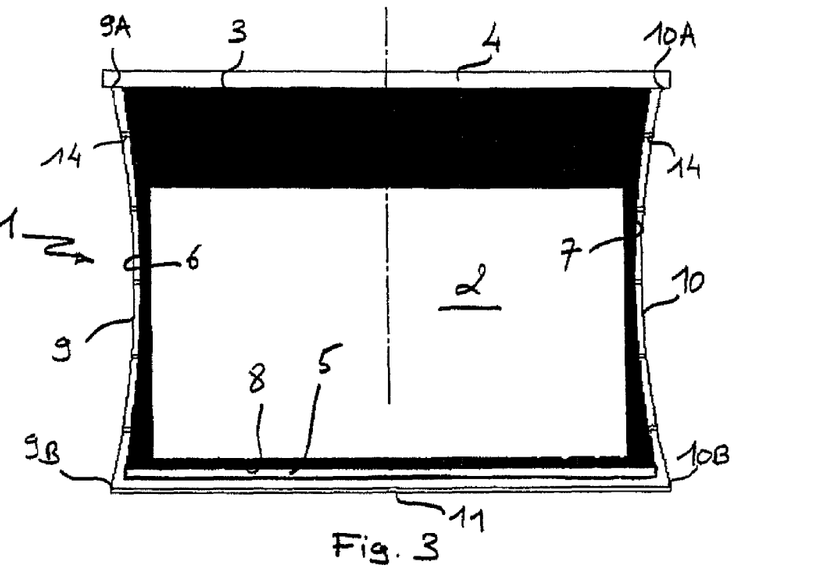
FIG. 3 is a face view of a roll-up projection screen of the invention.

FIG. 3 shows a roll-up projection screen 1 that extends substantially vertically when rolled out. Said screen has a projection surface 2 of generally rectangular shape that is suitable for being rolled up and rolled out, said screen, in the rolled-out state, presenting two longitudinal edges 8 and 3 at the bottom and at the top that are substantially horizontal, and two lateral edges 6 and 7 that are substantially vertical. Said projection surface 2 is suitable for rolling around a roller 4 mounted to rotate about an axis of rotation housed in a protective casing (not shown) that forms an element for holding the ends of the rotary shaft of the roller. The protective casing is generally fastened to the ceiling or the wall of a room.

The protective casing also houses the projection surface 2 in the rolled-up state around the roller 4. Preferably, the screen is rolled up and rolled out by means of an electric motor for driving the roller 4 in rotation. In a variant, provision may be made to replace the electric motor with a manual mechanical device.

In the example shown in the figures, said projection surface is constituted by a woven fabric based on PVC-coated glass fiber yarns, said fabric being said to have low elasticity.

Said projection screen 1 also includes means for inserting vertical traction forces FV on the projection surface 2, said means being formed by weighting means 5 fastened to or in the vicinity of the bottom longitudinal edge 8 of the projection surface 2.

Means 9, 10, 11 are also provided for exerting horizontal traction forces FH on the projection surface 2, which means comprise two deformable elongate elements 9 and 10 such as cables or cords. Each element 9, 10 is connected to said roller 4 at its top end 9A, 10A and is also connected at a plurality of points to a corresponding one of the lateral edges 6, 7 of the projection surface 2, and in its state connected to the corresponding side edge 6, 7 it extends along a circular arc with the concave side thereof facing away from the projection surface 2. As shown in FIG. 3, said means for exerting horizontal traction forces FH also comprise weighting means 11 that are fastened to, or in the vicinity of, the bottom ends 9B, 10B of each deformable elongate element 9, 10. The horizontal traction forces FH are substantially orthogonal to the direction in which the screen is rolled up and rolled out. The elongate elements 9, 10 are said to be "deformable" in the sense that they can change shape, e.g. radius of curvature. In the example shown in the figures, each deformable elongate element 9, 10 is a cable.

The elongate elements 9, 10 may also be stretchable, i.e. elastically deformable lengthwise, or they may be non-stretchable. The use of a stretchable elongate element 9, 10 has the advantage, while rolling up the projection surface, of enabling the rolled-up length of each elongate element 9, 10 to be collected even though it winds more slowly about the roller 4 than does the projection surface 2. As it rolls up, the projection surface 2 rolls about a diameter that increases progressively, unlike the roll-up diameter of each elongate element 9, 10 that remains substantially constant since it is rolled up on a portion of the roller 4 and not onto itself. Naturally, under such circumstances, a fraction of the forces exerted by the weighting means 11 is used for elastically lengthening said elongate elements.

In characteristic manner of the invention, said weighting means 11 for exerting horizontal traction forces FH and said weighting means 5 for exerting vertical traction forces FV are distinct and they are mounted to perform independent weighting actions in at least one position corresponding to said utilization position or one of said utilization positions. The roll-up and roll-out directions correspond substantially to the vertical.

For a fixed screen, only one utilization position for the projection surface is available, said utilization position corresponding to the position in which the projection surface extends. For a roll-up screen, as in the examples shown in the Figures, the user may vary the length of the projection surface that is rolled out as a function of the desired format (e.g. 16:9; 2:35; or 1:85). Each format thus corresponds to a particular utilization position of the projection surface.

By means of the screen of the invention, in at least one utilization position of the projection surface, the weighting means for exerting vertical traction are suspended from the bottom longitudinal edge of the projection surface, and the weighting means for exerting horizontal traction are suspended from the bottom ends of the deformable elongate elements, without there being any interference between said weighting means. As a result, in the utilization position of the screen, the weight of the means for weighting the deformable elongate elements is not taken up by the means for weighting the bottom longitudinal edge of the projection surface. In other words, the weighting means 11 fastened to the cables are not mechanically connected to the means 5 for weighting the bottom longitudinal edge of the projection surface, thus making it possible to adjust the horizontal traction forces exerted on the projection surface independently of the vertical traction forces exerted on said projection surface. Such a design for the screen of the invention makes it possible to obtain better planeness for the projection surface in the utilization position.

Since each cable 9, 10 is connected via its top end 9B, 10B to or to the vicinity of one end of the roller 4 that is situated close to the connection supporting the rotary shaft of the roller 4, any risk of said roller 4 bending is limited. In addition, the weight of the means 11 for weighting the cables is not taken up by the means 5 for weighting the bottom longitudinal edge 8 of the projection surface, so the vertical traction forces to which the roller 4 is subjected are reduced in comparison with a roll-up projection screen of the state of the art in which the means for weighting the cables and for weighting the bottom longitudinal edge are not independent.

As shown in FIG. 3, the weighting means 5 fastened to, or in the vicinity of, the bottom longitudinal edge 8 of the projection surface 2 are formed by a weighting bar that extends substantially parallel to said bottom longitudinal edge 8. The weighting means 11 fastened to or, to in the vicinity of, the bottom ends 9B, 10B of the cables 9, 10 are formed by another weighting bar interconnecting said bottom ends 9B, 10B of said cables 9, 10 and extending substantially parallel to the weighting bar of the bottom longitudinal edge 8 of the projection surface 2. The weighting bars 11, 5 are preferably made of metal.

Thus, in the example shown in FIGS. 3 to 9, the weighting means fastened to the bottom end 9B of the deformable elongate element 9 are common to the weighting means fastened to the bottom end 10B of the elongate element 10. In a variant, provision could be made for the weighting means fastened to the bottom end 9B of the deformable elongate element 9 to be distinct from the weighting means fastened to the bottom end 10B of the elongate element 10.

The use of a weighting bar interconnecting the ends of the cables in order to weight them enables the weighting means to be formed so that they move together in the roll-up and roll-out directions. As shown in FIG. 3, the weighting bar 11 is longer than the weighting bar 5, and said weighting bar 11 is held in equilibrium solely by its connections to the bottom ends of the cables.

Figure 4:
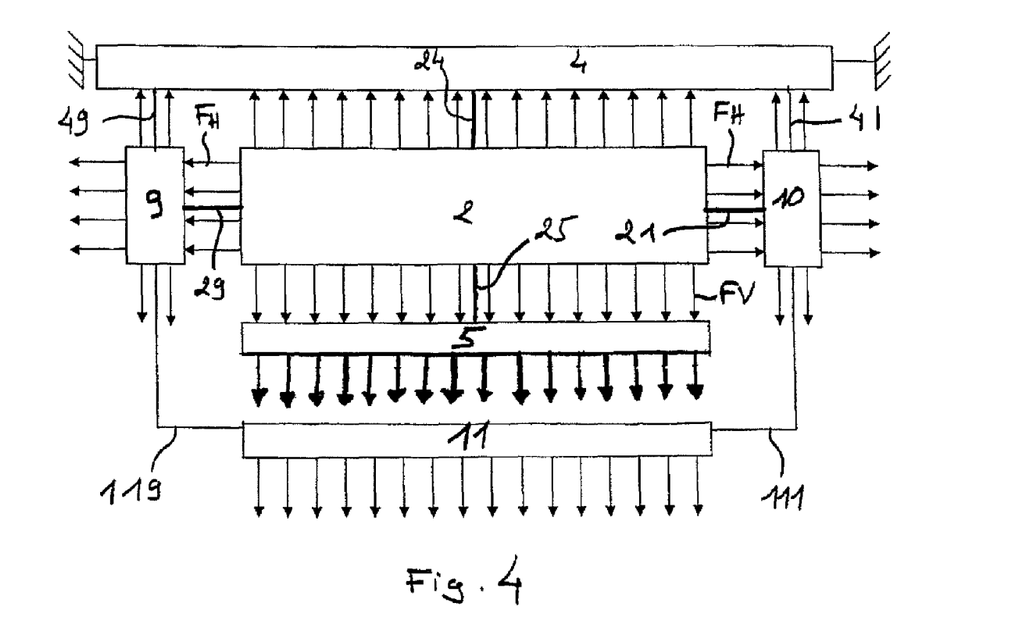
FIG. 4 is a diagrammatic view of the mechanical connections and of the distributions of forces between the various members of the FIG. 3 projection screen.

In the diagram of the mechanical connections between the various members of the screen and the distribution of the forces (represented by arrows) between said members, as shown in FIG. 4, the lines referenced 21, 24, 25, 29, 41, 49, 111, and 119 represent the mechanical connections that exist between the members connected together by said lines. Said members, which comprise the projection surface 2, the elongate elements 9, 10 arranged in circular arcs, the roller 4, and the weighting bars 5 and 11 are themselves represented by rectangles. Thus, via the attachment connections 24 and 25, the weight of the bar 5 is taken up by the projection surface 2, and the vertical traction forces FV that result therefrom are taken up by the roller 4. Similarly, via the attachment connections 119 and 111 between the bar 11 and respective ones of the cables 9 and 10, the weight of the bar 11 is taken up by the cables 9 and 10. Since the cables 9 and 10 are likewise attached (see connections 49 and 41) to the ends of the roller 4 close to the ends supporting the rotary shaft of the roller, said ends of the roller 4 take up a fraction of the forces to which the cables 9 and 10 are subjected. In addition, under the weight of the bar 11, each arcuate cable becomes tensioned and thus exerts horizontal traction forces via the attachment connections 21 and 29 on the lateral edges 6, 7 of the projection surface 2.

In the example shown in the figures, each lateral edge 6, 7 of the projection surface presents a circularly arcuate profile with its concave side facing away from the projection surface. Provision is made to fasten the attachment elements 14 at a plurality of points along each lateral edge 6, 7 so as to connect each cable 9, 10 to the corresponding lateral edge 6, 7 via the attachment elements 14. These attachment elements 14 extend substantially horizontally in the utilization position of the projection surface and they are of substantially the same length. One end of each of these attachment elements 14 is fastened to a lateral edge 6, 7, and the other end thereof is connected to the corresponding cable 9, 10. The attachment elements 14 may be secured to the corresponding lateral edges 6, 7 of the projection surface 2 directly, or indirectly by means of reinforcing strips (not shown) fastened along said lateral edges of the projection surface. In a variant, the attachment elements may be replaced by guide elements such as eyelets or rings through the cables pass. In any event, since each lateral edge of the projection surface is arcuate and since the guide or attachment elements are of substantially the same length, each cable co-operating with the guide or attachment elements likewise extends, in the utilization position of the projection surface, along a circular arc with its concave side facing away from the projection surface.

In a variant, provision may be made for the lateral edges of the projection surface to be straight and for the lengths of the attachment elements for each lateral edge to increase on going away from the center of the projection surface towards its top or bottom portion, such that the cable associated with these attachment elements extends along a circular arc.

As mentioned above, the circularly arcuate shape of the cable makes it possible, by tensioning said cable using the weighting means 11, to exert horizontal traction forces FH on the projection surface. In addition, the regularity of the circularly arcuate shape of each cable and the regular distribution of the attachment elements along the corresponding lateral edge of the projection surface makes it possible to obtain a good distribution of the horizontal traction forces along the corresponding lateral edge of the projection surface.

Preferably, the weighting bar 11 for exerting the horizontal traction forces FH and the weighting bar 5 for exerting the vertical traction forces FV are free to move axially relative to each other in the roll-up and roll-out directions so as to occupy at least two positions, one in which said bars 5 and 11 are free from mutual bearing contact in the vertical direction, and the other in which said bars 5, 11 come into bearing contact in the vertical direction, the portions of said bars 5, 11 that come into contact forming entrainment means enabling said bar 5 to entrain vertical movement of the bar 11.

During the roll-up stage, the entrainment means are active over a fraction of the roll-up stroke of the projection surface that corresponds at least to the end fraction of the roll-up stroke. Said entrainment means serve to ensure that too great a separation does not appear between the bars 5, 11 while rolling up. In the absence of entrainment means, the weighting bar 11 connected to the cables 9, 10 would move upwards more slowly than the bar 5 connected to the bottom longitudinal edge 8 of the projection surface, and as a result the spacing between them would continue to increase while rolling up, which would lead to problems of stowing the weighting bars in the casing. In addition, in the absence of entrainment means, the cables 9, 10 would remain tensioned during rolling up, and that would not allow the projection surface 2 to roll up correctly.

Figure 5:
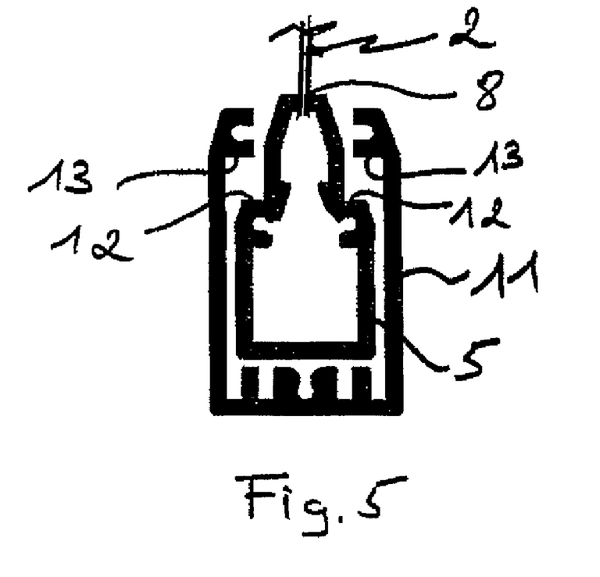
FIG. 5 is a fragmentary cross-section view of a projection screen in a preferred embodiment of the invention, said view showing the relative positions of the bars for weighting the screen when the screen is in its utilization position.
Figure 6:
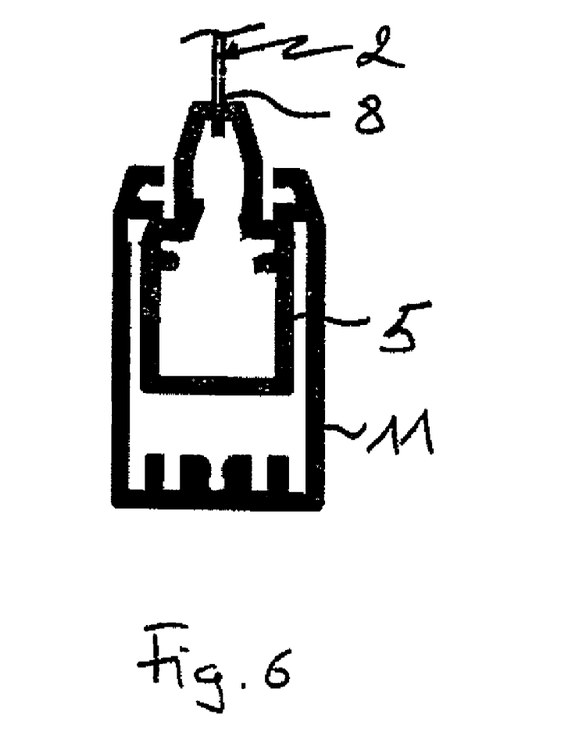
FIG. 6 is a fragmentary cross-section view of the FIG. 5 projection screen, this view showing the relative positions of the weighting bars and of the screen during a stage of rolling up said screen.

In a preferred embodiment of the invention shown in FIGS. 5 and 6, the bar 11 for weighting the cables 9 and 10 is hollow and houses the bar 5 for weighting the bottom longitudinal edge 8 of the projection surface 2, leaving a certain amount of vertical clearance in the utilization position of the screen. The example shown in FIGS. 5 and 6 has provision for entrainment means enabling the weighting bar 5 to entrain the weighting bar 11, as described above. Said entrainment means are formed by an inside bearing surface 13 in said hollow weighting bar 11 that is suitable for co-operating with an outside bearing surface 12 of the weighting bar 5 housed inside the weighting bar 11.

In the example shown in FIG. 5, the screen is rolled out and the weighting bars are free relative to each other. In other words, said weighting bars 11 and 5 are not in vertical retaining or bearing contact, thus making it possible, as explained above, for the weighting bar 11 in co-operation with the cables 9, 10 to exert horizontal traction forces on the projection surface. As shown in FIG. 6, while rolling up, the weighting bar 11 rises more quickly than the weighting bar 11 such that after a certain amount of roll-up stroke, it comes into abutment via its outside surface 12 against the inside surface 13 of the hollow weighting bar 11. The weighting bar 11 then entrains the weighting bar 11 vertically, thereby relaxing the cables 9, 10. The projection surface 2 is then no longer subjected to horizontal traction, thus allowing the projection surface to be rolled up correctly around the roller 4.

While rolling out, the weighting bar 5 connected to the bottom longitudinal edge 8 of the projection surface moves downwards more quickly than the weighting bar 11 connected to the cables 9, 10. The cables 9, 10 then automatically become tensioned under the weight of the weighting bar 11, since it is no longer retained vertically by the weighting bar 5.

The bottom longitudinal edge 8 of the projection surface 2 may be connected to the weighting bar 5 via an aluminum connection rod (not shown) of upside-down V-shaped cross-section when the screen is in the utilization position. The bottom longitudinal edge 8 of the projection surface is secured to the top of the connection rod and the V-shaped profile of said rod enables the connection rod to be properly inserted in the weighting bar 5. The weighting bar 5 is in the form of a longitudinally-split hollow section member with the upside-down V-shaped profile of the connection rod co-operating via the apex of the V-shape with said slot when the connection rod is in the inserted state inside the weighting bar 5, so as to enable the weighting bar 5 to be maintained in the suspended state. The use of such a connection rod enables the bottom longitudinal edge 8 of the projection surface 2 to be connected easily and correctly to the weighting bar 5.

In order to enable the weighting bar 5 to be mounted inside the weighting bar 11, the weighting bar 11 comprises a main segment that is open at both ends, and two endpieces 16 that are fitted to said ends in order to close them once the weighting bar 5 has been inserted inside the weighting bar 11.

Each endpiece 16 forming an end of the bar 11 is designed to receive the bottom end of one of the cables 9, 10.

In the example shown in FIGS. 5 and 6, the bars 5 and 11 are designed to come into bearing contact after traveling along a certain amount of the roll-up stroke. In a variant, provision may be made for these bars not to come into bearing contact but rather into retention contact. Provision may be made to connect the bars 5 and 11 together vertically by means of a link such as a wire of length that is selected in such a manner as to ensure firstly that in the utilization position of the screen said link wire is completely relaxed, with the bars thus being vertically free relative to each other, and secondly, while rolling up, after traveling along a certain roll-up stroke, the link wire becomes tensioned under the effect of the bar 5 rising, thereby entraining and retaining the bar 11.

Figure 7:
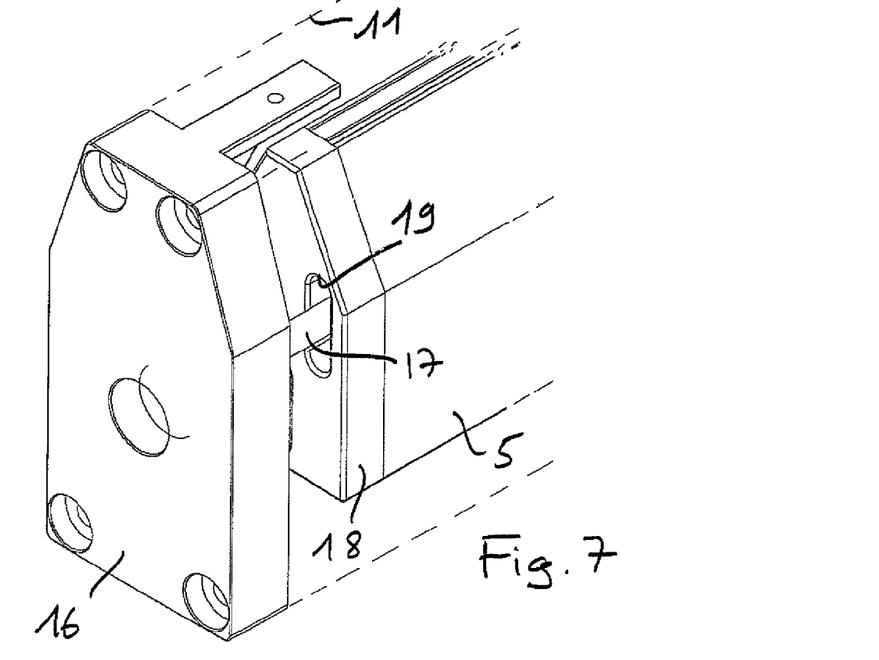
FIG. 7 is a perspective view of the endpieces of the weighting bars in a variant embodiment of the screen of the invention, said view showing the relative positions of the endpieces of the weighting bars in the utilization position of said screen.
Figure 8:
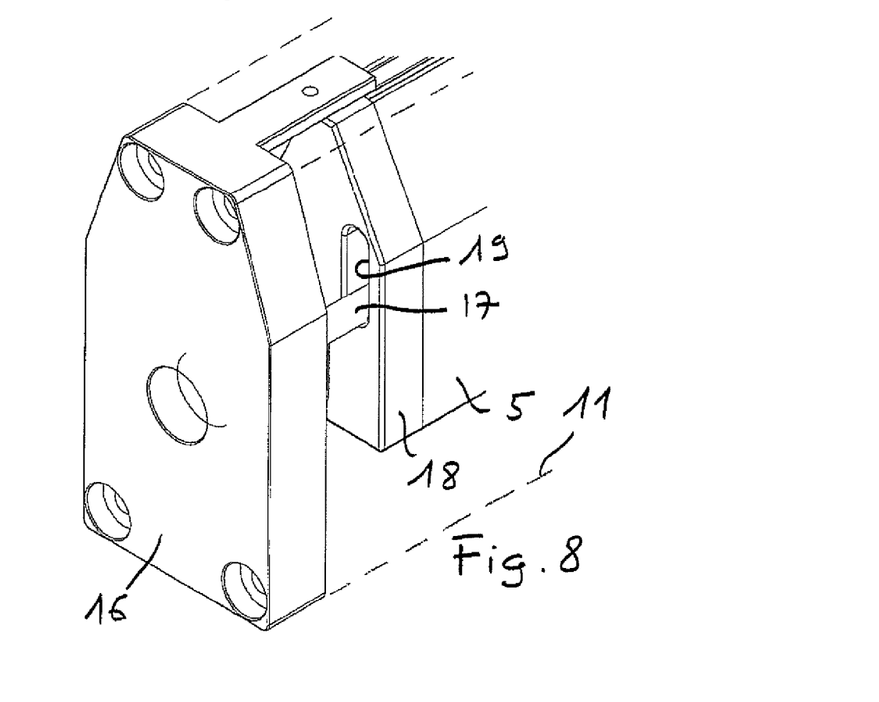
FIG. 8 is a perspective view of the endpieces of the weighting bars of FIG. 7, said view showing the relative positions of the endpieces of the weighting bars while rolling up said screen.

In a variant of the embodiment shown in FIGS. 5 and 6, and as shown in FIGS. 7 and 8, it is possible to provide for the means enabling the bar 5, referred to as the vertical traction bar, to entrain the movement of the bar 11, referred to as the horizontal traction bar, to be formed by two sets of male and female type members, one set carried by the end portions of the horizontal traction bar 11 and the other set by the end portions of the vertical traction bar 5. In the example shown in FIGS. 7 and 8, the male members are formed by tenons 17 carried by the endpieces 16 that close the open ends of the hollow horizontal traction bar 11, and the female members are formed by oblong-shaped openings 19 formed in endpieces 18 that close the open ends of the hollow vertical traction bar 5. The cables 9, 10 are connected to the endpieces 16 of the horizontal traction bar 11. When the vertical traction bar 5 is in its inserted state inside the horizontal traction bar 11 and the endpieces 16 and 18 are fitted to the ends of said bars, the tenons 17 are inserted in the openings 19. Because of the vertical oblong shape of each opening 19, each tenon 17 inserted in a said opening 19 is free to move along said opening 19. In the example shown in FIG. 7, when the screen is in its utilization position, the tenons 17 and the openings 19 are free from any mutual bearing contact. Thus, in a manner similar to the embodiment shown in FIG. 5, the weighting bars 11 and 5 are not in vertical bearing contact, thereby allowing the weighting bar 11 in co-operation with the cables 9 and 10 to exert horizontal traction forces on the projection surface. Conversely, in the example shown in FIG. 8, during rolling up, the inside edge of each opening 19 comes into vertical bearing contact with the corresponding tenon 17. In a manner similar to the embodiment of FIG. 6, the weighting bar 5 then entrains the weighting bar 11 vertically, thus relaxing the cables 9 and 10. The projection surface 2 is no longer subjected to horizontal traction, thereby enabling the projection surface to be rolled up correctly around the roller 4.

In the example shown in FIGS. 7 and 8, each endpiece 16 of the bar 11 has two tenons 17 co-operating with two oblong openings 19 formed in the corresponding endpiece 18 of the bar 5. The use of two sets of male and female members at each of the ends of the bars serves to prevent relative rotation between the bars. Furthermore, such a design of the means for enabling the bar 5 to entrain the bar 11 serves to limit the lost motion between the bars transversely to the roll-up or roll-out direction and to the axial direction of each of the bars. In a variant, it is possible to envisage the female type members being disposed in the endpieces of the horizontal traction bar and for the male type members to be disposed on the endpieces of the vertical traction bar.

In a variant (not shown) of the example shown in FIGS. 7 and 8, in which each vertical traction bar 5 is likewise formed by a section member with two endpieces 18, and in which the horizontal traction bar 11 is likewise formed by a section member with two endpieces 16, said means enabling the vertical traction bar to entrain movement of the horizontal traction bar are formed by plane bearing surfaces formed at each end of the bars, firstly on a portion of the endpiece 18 of the vertical traction bar 5 and secondly on a portion of the endpiece 16 of the horizontal traction bar 11. Preferably, the plane bearing surface formed on each endpiece 18 of the vertical traction bar 5 is formed by the outside face of the top wall of the endpiece 18, and the plane bearing surface formed on each endpiece 16 of the horizontal traction bar 11 is formed by the bottom face of the top wall of the endpiece 16. Since the section-member bars are long, their linear structure is not perfect, i.e. they present dimensional irregularities, which means that it is not possible to ensure in reliable manner that the vertical traction bar 5 does indeed entrain the movement of the horizontal traction bar 11. Conversely, since the endpieces 16 and 18 are short compared to the bars, the dimensions desired for the endpieces 16 and 18 can be obtained with great accuracy. In particular, provision can be made for the endpieces 18 to be dimensioned in such a manner that the top portion of the section member of the vertical traction bar 5 is set back from the endpieces 18 such that when the bars 5 and 11 into bearing contact during rolling up, the bearing contact takes place between the plane bearing surfaces of the endpieces 16, 18, while the section member bodies of the two bars do not touch each other.

Preferably, provision is made to limit the lateral clearance between the bars 5 and 11 in the direction that is transverse to the roll-up direction and to the axial direction of the bars, not by means of tenons (FIGS. 7 and 8) but by designing firstly the endpieces 18 so that their dimension in said transverse direction is sufficient to limit said lateral clearance between the two bars 5 and 11, and secondly by leaving sufficient clearance between the section members of the two bars in said transverse direction in order to limit any risk of the bars 5, 11 jamming together while the bar 5 is being mounted inside the bar 11. As mentioned above, the long section members of the two bars 5 and 11 present a linear structure that is not perfect, unlike the endpieces 18 for which the desired dimensions can be obtained accurately. Provision can thus be made for the dimension of the endpieces 18 in said transverse direction to be greater than the dimension of the section member of the bar 5 in said transverse direction, while being of a dimension that is only just smaller in said transverse direction than the dimension of the housing defined by the hollow bar 11 for inserting the bar 5, so as to minimize the lateral clearance between the two bars 5 and 11. The transverse dimension of each endpiece 18 of the bar 5 is thus selected to be suitable for limiting the lateral (or transverse) clearance between the bars 5 and 11.

Advantageously, the screen also includes adjustment means (not shown) for adjusting the level of the horizontal traction bar 11 relative to the vertical traction bar 5, so that in the desired utilization position for the projection surface 2, the horizontal traction bar 11 and the vertical traction bar 5 are free from any vertical retaining or bearing contact between each other. These adjustment means are formed, for each of the cables 9 and 10, by a mechanism associated with the horizontal traction bar 11, the mechanism comprising in conventional manner a wheel having one end of the cable fastened thereto and a screw enabling the wheel to be turned. The wheel also has a peripheral groove in which the cable can wind in and out when the wheel is turned in one direction or the other. The adjustment means also include means for locking the wheel in position, said means being formed by a male portion suitable for co-operating with a female portion to prevent the wheel from turning. The locking means can be deactivated by pressing on the screw, thereby enabling the male portion to be moved away from the female portion. A spring enables the wheel to be returned to the locked position. Preferably, each mechanism is housed in one of the endpieces 16 of the horizontal weighting bar.

When the user rolls out the projection surface to a length that corresponds to the desired utilization position, it can happen that the traction bars 5 and 11 are still in bearing contact. Under such circumstances, the user acts on the screw of each of the adjustment mechanisms to adjust the length of the corresponding cable 9, 10 that is wound on the wheel so as to position the horizontal traction bar at a level in which said bars are free from vertical retaining or bearing contact and thus exert independent weighting actions.

The present invention is not limited in any way to the embodiments described and shown, and the person skilled in the art can apply any variant thereto in accordance with the spirit of the invention.

The invention claimed is:

1. A projection screen comprising:
   a projection surface of generally rectangular shape, having top and bottom longitudinal edges that are substantially horizontal and further having two lateral edges, said surface being suitable for being tensioned and extending at least in part in a plane that is substantially vertical, at least in a utilization position;
   support means for supporting the projection surface in a suspended state in said at least one utilization position, said support means being connected to the top longitudinal edge of the projection surface;
   first means for exerting vertical traction forces on the projection surface, said first means comprising at least weighting means fastened to or in the vicinity of the bottom longitudinal edge of the projection surface; and
   means for exerting horizontal fraction forces on the projection surface, said means for exerting comprising at least second weighting means and two deformable elongate elements, each deformable elongate element being connected at, or in vicinity of, its top end to said support means and at, or in vicinity of, its bottom end to said second weighting means and being further connected to a corresponding one of the lateral edges of the projection surface, each deformable elongate element being arranged to apply a load of said associated second weighting means in form of the horizontal traction forces to the corresponding lateral edge,
   wherein said second weighting means and said first weighting means are distinct and are mounted to exert independent weighting actions in at said utilization position, and wherein the first weighting means and the second weighting means are mutually positioned such that the first and the second weighting means are independent from one another when the projection surface is in the utilization position, and the first weighting means cause upward movement of the second weighting means when the projection surface is retracted upward.

2. The projection screen according to claim 1, wherein the second weighting means fastened to, or in the vicinity of, a bottom end of one of the deformable elongate elements are coupled to the second weighting means that are fastened to, or in the vicinity, of a bottom end of another one of said deformable elongate elements to form an assembly that moves as a unit in a vertical direction.

3. The projection screen according to claim 1, wherein the first weighting means fastened to, or in the vicinity of, the bottom longitudinal edge of the projection surface comprise a first weighting bar extending substantially parallel to said bottom longitudinal edge, and wherein the second weighting means fastened to, or in the vicinity of, bottom ends of the deformable elongate elements comprise a second weighting bar interconnecting the bottom ends of said deformable elongate elements and extending substantially parallel to the first weighting bar weighting.

4. The projection screen according to claim 1, wherein the second weighting means fastened to, or in the vicinity of, the ends of the deformable elongate elements comprise a hollow bar having said first weighting means housed therein with vertical clearance in the utilization position of the screen.

5. The projection screen according to claim 1, further comprising means for adjusting a vertical position of the second weighting means relative to the first weighting means such that in the utilization position of the projection surface, said first and said second weighting means are free from mutual vertical retaining or bearing contact.

6. The projection screen according to claim 1, wherein the first and the second weighting means are independent from one another by being free from mutual vertical retaining or bearing contact, and wherein the first weighting means cause the upward movement of the second weighting means by coming into contact and forming entrainment means for entraining vertical movement of the second weighting means.

7. The projection screen according to claim 6, wherein the first and the second weighting means each comprise a hollow weighting bar, the first weighting means being received within the second weighting means with vertical clearance in the utilization position, the second weighting means having an inside bearing surface configured to cooperate with an outside bearing surface of the first weighting means.

8. The projection screen according to claim 6, wherein the first and the second weighting means each comprise a hollow weighting bar, the first weighting means being received within the second weighting means with vertical clearance in the utilization position, and wherein said entrainment means are formed by sets of male and female members, one of said sets of male and female members being carried by end portions of the second weighting means and the other set by end portions of the first weighting means, said male and female members being configured to be moved relative to one another in roll-up and roll-out directions of the projection screen so as to occupy at least two positions, one in which said male and female type members are free of mutual vertical or retaining contact and the other in which the male and female type members come into mutual vertical retaining or bearing contact.

9. The projection screen according to claim 1, wherein the first and the second weighting means each comprise a hollow weighting bar, the first weighting means being received within the second weighting means with vertical clearance in the utilization position, the first and the second weighting means each having a section member provided at each end with a respective endpiece, and wherein, in a direction transverse or perpendicular to a roll-up direction and to a longitudinal axis of the first weighting means, the endpieces of the first weighting means are of a dimension greater than a crosswise dimension of first weighting means and suitable for limiting clearance between the first and the second weighting means in said direction transverse or perpendicular to the roll-up direction and to the longitudinal axis of the first weighting means.

10. The projection screen according to claim 1, wherein the projection surface comprises a fabric.

11. The projection screen according to the claim 10, wherein the fabric of said projection surface comprises PVC-coated fiberglass yarns, said fabric being a low-elasticity fabric.

* * * * *